(12) United States Patent
Kouladjie

(10) Patent No.: US 9,628,270 B2
(45) Date of Patent: Apr. 18, 2017

(54) CRYPTOGRAPHICALLY-VERIFIABLE ATTESTATION LABEL

(71) Applicant: MICROSOFT TECHNOLOGY LICENSING, LLC, Redmond, WA (US)

(72) Inventor: Kambiz Kouladjie, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 86 days.

(21) Appl. No.: 14/481,787

(22) Filed: Sep. 9, 2014

(65) Prior Publication Data

US 2016/0072626 A1 Mar. 10, 2016

(51) Int. Cl.
*G06F 21/00* (2013.01)
*H04L 9/08* (2006.01)
*G06F 12/14* (2006.01)
*G06F 21/36* (2013.01)
*G06F 21/44* (2013.01)

(52) U.S. Cl.
CPC ........ *H04L 9/0838* (2013.01); *G06F 12/1408* (2013.01); *G06F 21/36* (2013.01); *G06F 21/44* (2013.01); *G06F 2212/1052* (2013.01); *H04L 2209/24* (2013.01)

(58) Field of Classification Search
CPC ...... G06F 12/1408; G06F 21/36; G06F 21/44; G06F 2212/1052; G06K 19/06009; H04L 9/0838; H04L 2209/24
USPC ........................................................ 713/189
See application file for complete search history.

(56) References Cited

U.S. PATENT DOCUMENTS

| | | | |
|---|---|---|---|
| 8,533,075 B1 | 9/2013 | Sayers et al. | |
| 2005/0169496 A1* | 8/2005 | Perry | G06F 21/10 382/100 |
| 2006/0097062 A1* | 5/2006 | Cheong | G06K 19/06037 235/494 |
| 2007/0109124 A1* | 5/2007 | Park | G06Q 20/341 340/572.1 |
| 2007/0215685 A1 | 9/2007 | Self et al. | |
| 2013/0277425 A1* | 10/2013 | Sharma | B65D 90/00 235/376 |

(Continued)

FOREIGN PATENT DOCUMENTS

| | | | | |
|---|---|---|---|---|
| GB | WO 2014091252 A1 * | 6/2014 | ............. | G06F 21/36 |
| WO | 2009074866 A2 | 6/2009 | | |

(Continued)

OTHER PUBLICATIONS

"Fraud FAQs", Published on: Mar. 13, 2012 Available at: http://h20423.www2.hp.com/program/fraud/in/en/fraud_faq.asp.

(Continued)

*Primary Examiner* — Yogesh Paliwal
(74) *Attorney, Agent, or Firm* — Alleman Hall McCoy Russell & Tuttle LLP

(57) ABSTRACT

A label includes a first readable object encoding a trust anchor. The trust anchor is encrypted with a cryptographic key. The attestation label further includes a second readable object encoding attestation service information and encoding an identification code. The identification code is encrypted using the trust anchor. The attestation label further includes a non-encoded representation of the identification code.

14 Claims, 9 Drawing Sheets

(56) References Cited

U.S. PATENT DOCUMENTS

| 2014/0110468 A1 | 4/2014 | Kandregula |
| 2014/0143090 A1 | 5/2014 | Deyle et al. |
| 2014/0262902 A1* | 9/2014 | Kasper .................. B65D 55/06 206/459.5 |
| 2015/0036823 A1* | 2/2015 | Graube ................ H04W 12/02 380/274 |

FOREIGN PATENT DOCUMENTS

| WO | 2013068767 A1 | 5/2013 |
| WO | 2013129964 A1 | 9/2013 |
| WO | 2014029010 A1 | 2/2014 |
| WO | 2014091252 A1 | 6/2014 |

OTHER PUBLICATIONS

"Using Custom QR Codes to Help Defeat Counterfeit Products", Published on: May 18, 2012 Available at: http://beqrious.com/using-custom-qr-codes-to-help-defeat-counterfeit-products/.
Menezes, A. et al., "Chapter 10: Identification and Entity Authentication", Handbook of Applied Cryptography, CRC Press, Oct. 1996, 41 pages.
ISA European Patent Office, International Search Report and Written Opinion Issued in Application No. PCT/US2015/048745, Dec. 7, 2015, WIPO, 12 pages.
IPEA European Patent Office, Second Written Opinion Issued in PCT Application No. PCT/US2015/048745, Jul. 22, 2016, WIPO, 7 pages.
IPEA European Patent Office, International Report on Patentability Issued in PCT Application No. PCT/US2015/048745, Dec. 2, 2016, WIPO, 8 pages.

* cited by examiner

CRYPTOGRAPHICALLY-VERIFIABLE ATTESTATION LABEL

BACKGROUND

Counterfeiting products that misrepresent a company may cause the company's reputation to be negatively affected. Moreover, such illicit practices may cause a company to lose revenue. Various forms of counterfeiting and misrepresentation of products may occur in different phases of a company's supply chain and product lifecycle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to a cryptographically verifiably attestation label are disclosed. In one embodiment, a label includes a first readable object encoding a trust anchor. The trust anchor may be encrypted with a cryptographic key. The attestation label may further include a second readable object encoding attestation service information and encoding an identification code. The identification code may be encrypted using the trust anchor. The attestation label may further include a non-encoded representation of the identification code.

DETAILED DESCRIPTION

In order to reduce a likelihood of counterfeiting, hacking, jailbreaking, or otherwise compromising a product, the present description relates to various approaches for authenticating a product on demand, in different phases of a supply chain and/or life cycle of the product. More particularly, the present disclosure relates to an attestation label that may be associated with a product in order to verify the authenticity of the product. The attestation label may be used to authenticate the product both internally within an organization that produces the product and externally by a consumer or vendor of the product.

Figure 1:
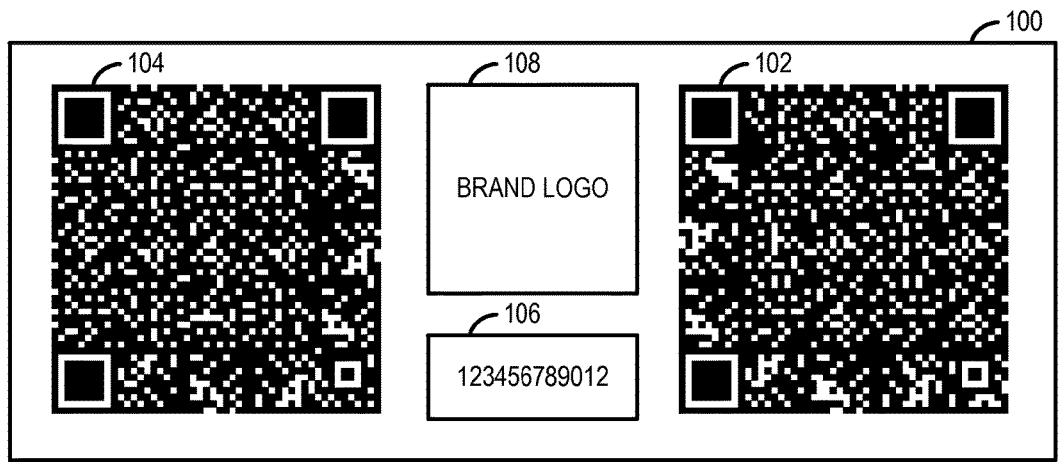
FIG. 1 shows an example attestation label.

FIG. 1 shows an example attestation label 100. Attestation label 100 includes a first readable object 102, a second readable object 104, and a visually-readable identification code 106. The attestation label 100 may optionally include information relating to an organization and/or a product that is produced by the organization, such as a brand logo 108.

The first readable object 102 and the second readable object 104 may be configured to be read, recognized, or comprehended in any suitable manner For example, the first and second readable objects may be recognized visually, magnetically, electrically, haptically, or in another suitable manner. Moreover, the first and second readable objects may take any suitable form. For example, the first and second readable objects may be visually-readable objects including barcodes, matrix barcodes, or another suitable form of visually-readable object that encodes information.

In the illustrated example, the first and second readable objects are quick read (QR) codes. The QR codes may be scanned and decoded by a client computing device to decode information encoded by the QR code. A client computing device may take any suitable form including a smartphone, a personal digital assistant (PDA), mobile computing device, or other computing device capable of scanning and decoding the first and second readable objects.

The first readable object 102 may encode a trust anchor encrypted with a cryptographic key. The trust anchor may include any suitable form of secret information. For example, the trust anchor may include numbers, letters, other characters, or a combination thereof. The trust anchor and the cryptographic key used to encrypt the trust anchor may be confidentially known by members of an organization that produces the attestation label 100 and/or produces a product associated with the attestation label. Since the cryptographic key and the trust anchor are confidential, only members of the organization may be able to decrypt the information encoded in the first readable object 102 in order to validate the authenticity of the attestation label 100.

In some implementations, to increase security provided by the attestation label, the trust anchor may be selected from a set of available trust anchors. In one example, the set of available trust anchors may be used to print different batches of attestation labels. For example, each batch of attestation labels may be printed with a different trust anchor selected from the set of available trust anchors. Accordingly, the trust anchors may be rotated with each batch of attestation labels to vary the trust anchors used for different batches of attestation labels. In another example, the set of available trust anchors may be rotated within a batch of attestation labels such that different attestation labels within the same batch have different trust anchors. By using different trust anchors for different attestation labels, when one trust anchor becomes compromised, the validity of the other trust anchors may remain intact. In some implementations, when a trust anchor becomes compromised, the attestation label vendor may remove the compromised trust anchor from the set of available trust anchors so that the trust anchor is no longer used in printing attestation labels.

Furthermore, the cryptographic key used to encrypt the trust anchor may utilize any suitable type of cryptography. Moreover, a secret or key used in such cryptographic operations may be updated in any suitable manner to mitigate a compromise. For example, different secrets may expire and/or rotate use in cryptographic operations in order to provide additional security.

The second readable object 104 may encode attestation service information. For example, the second readable object 104 may encode an address of an attestation service computing device. For example, the address may include a uniform resource locator (URL). The URL may direct a client computing device to the attestation service computing device to send information obtained from an attestation label to the attestation service computing device. The attestation service computing device may be configured to provide authentication and validation information based on the information from the attestation label. In some implementations, the attestation service computing device further may be configured to provide information related to a product associated with the attestation label.

Furthermore, the second readable object 104 may encode the visually-readable identification code 106 encrypted using the trust anchor. By encrypting the visually-readable identification code using the trust anchor, the encrypted information may remain confidential even when the second readable object is decoded. In particular, only members of the organization that know the trust anchor may be able to decrypt the encrypted value from the second readable object 104 to determine that the encrypted value is in fact the visually-readable identification code 106.

In some implementations, the visually-readable identification code 106 may be encrypted using the trust anchor in combination with another suitable element in order to increase the complexity of the encryption. In one example, the visually-readable identification code may be encrypted using a combination of the trust anchor and the visually-readable identification code itself. In another example, the visually-readable identification code may be encrypted using a combination of the trust anchor and a cryptographic salt. For example, the salt may include any suitable random data that acts as an additional input to a one-way function that hashes the visually-readable identification code. In some implementations, a different salt may be randomly generated for each label and stored in a genealogy database of the attestation service computing device. In one example, the salt and the visually-readable identification code may be concatenated and processed with a cryptographic hash function, and the resulting output may be stored in the genealogy database and used to decrypt an encrypted value that represents the visually-readable identification code. Any suitable element may be used in combination with the trust anchor to encrypt the visually-readable identification code.

The attestation label 100 may include any suitable number of readable objects (e.g., QR codes). The readable objects may encode, encrypt, or otherwise embed information relating to a secret, a cryptographic key, an organization, a product, or other suitable information. In some implementations, each readable object may include information embedded in another readable object on the attestation label such that the readable objects may be chained together.

The visually-readable identification code 106 may provide a non-encoded and human-readable identification code for a product associated with the attestation label 100. In some implementations, attributes of the product may be associated with the visually-readable identification code 106. For example, the attributes may be linked to the visually-readable identification code in the genealogy database. Example attributes may include, but are not limited to, a manufacturer, a product description, a material, a size, a color, a packaging, a product model (e.g., full price or subscription), components included in the product, warranty terms, and other suitable attributes.

In some implementations, the attributes of the product may be directly encoded in the second readable object 104. Accordingly, when a client computing device decodes the second readable object, the attributes of the product may be presented directly to a user without communicating with the attestation service computing device.

The visually-readable identification code 106 may take any suitable form. For example, the visually-readable identification code 106 may include a serial number, a stock keeping unit (SKU), or another identifier. In some implementations, the identification code need not be visually readable or human readable.

The brand logotype 108 may promote public recognition of the organization that produces the attestation label and/or the associated product. By including the brand logotype 108 on the attestation label 100, a process of counterfeiting the attestation label may be made more complex. Moreover, the brand logotype 108 may aid in acting as a deterrent against infringement of intellectual property of the organization. Other features may additionally or alternatively be added to the attestation label.

Figure 2:
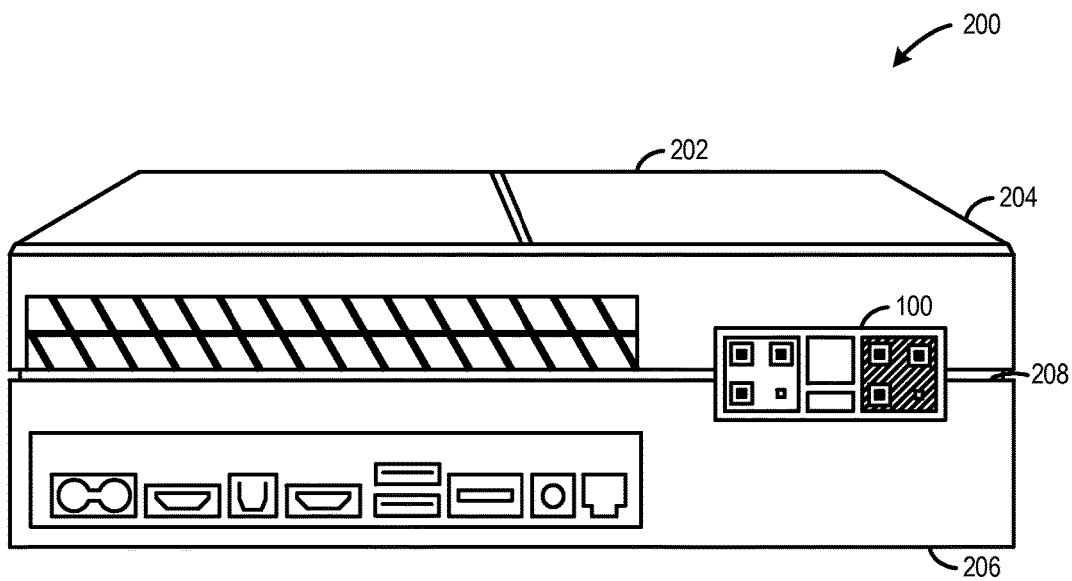
FIG. 2 shows the attestation label of FIG. 1 affixed to an example device.

The attestation label 100 may be affixed to any suitable product to provide a mechanism for authentication and validation of the product. FIG. 2 shows an example scenario in which the attestation label 100 is affixed to an example device 200. More particularly, in this implementation, the device 200 is depicted as a game console or entertainment computing device. The device 200 may comprise a housing 202 including a first portion 204 and a second portion 206. The first portion 204 and the second portion 206 may be coupled to form a seam 208. The attestation label 100 may be affixed across the seam 208. In some cases, a counterfeiter or other malicious individual may attempt to dismantle the device to gain access to internal components. By affixing the attestation label 100 across the seam 208, if the device 200 is dismantled such that the first and second portions are separated along the seam 208, then the attestation label 100 may provide visual evidence of the device 200 being tampered with. The attestation label 100 may be affixed to any suitable location on the device 200. Moreover, the attestation label 100 may be affixed to the device 200 in any suitable manner.

In the depicted example, the visually-readable identification code 106 may identify or otherwise be associated with the device 200. Further, the second readable object 104 may encode attestation service computing device information that may direct a user to the attestation service to receive authentication and validation information about the device. In particular, the attestation service computing device may determine whether the device is authentic or counterfeit. Further, the attestation service computing device may determine whether the device is valid or compromised/banned. In some implementations, the attestation service computing device may provide a plurality of attributes of the device 200.

Figure 3:
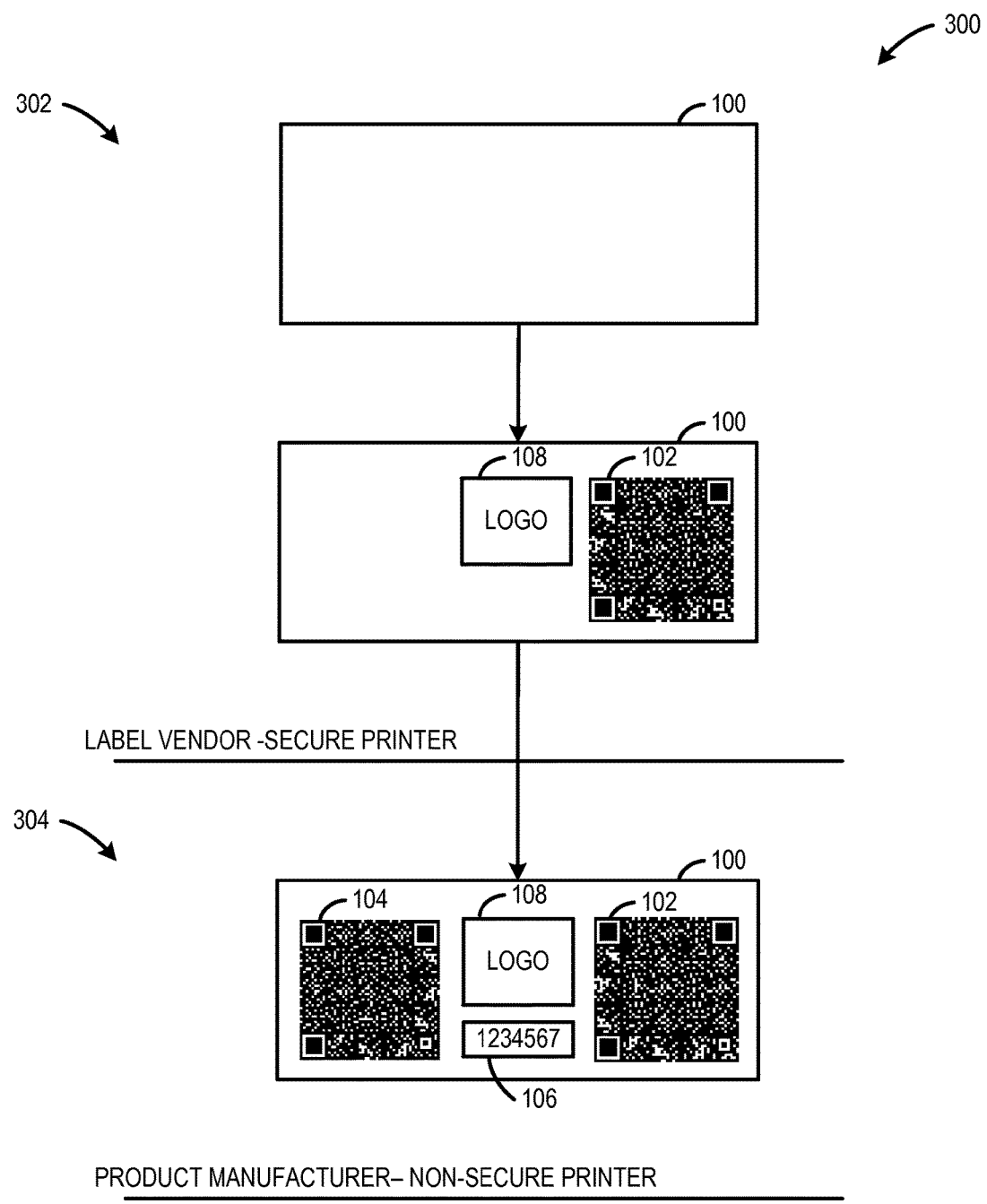
FIG. 3 shows an example process of creating an attestation label.

FIG. 3 shows an example process 300 of creating the attestation label 100. More particularly, the process 300 is a two-phase process including a first printing phase 302 performed by a secure printer and a second printing phase 304 performed by a non-secure printer. For example, the first printing phase 302 may be performed by a label vendor and the second printing phase 304 may be performed by a product manufacturer, assembler, packager, or by another party later in the product supply chain.

The label vendor may specialize in printing attestation labels having various security features using a secure printer. In one example, a security feature may include tamper evident material that self-destructs when tampered with. In particular, the material may fracture and create a peeling paint effect if the attestation label is removed from the product. In another example, a security feature may include a coating that prevents photocopying of the attestation label. In yet another example, a security feature may include a VOID material that leaves behind a repetitive "VOID" message on both the attestation label and the product to which it was applied if any attempt is made to remove the attestation label. In yet another example, a security feature may include a patterned ink design that is only readable with a black light. In yet another example, a security feature may include slits on the face of the attestation label that tear if the attestation label is removed. In yet another example, a security feature may include a lamination layer that makes the attestation label difficult to remove from a product. In yet another example, a security features includes a hologram printed on the attestation label. Such security features may reduce theft, provide counterfeiting protection, prevent unauthorized access, and protect against the altering, removal or photocopying of an attestation label.

The security printer may be configured to employ any suitable security feature, or combination of security features in printing the first portion of the attestation label during the first printing phase 302. In particular, the security printer may print the first readable object 102 and the brand logotype 108 on the attestation label during the first printing phase 302. In one example, the first readable object 102 may be printed in a particular color to distinguish the first readable object from the second readable object 104.

As discussed above, the first readable object 102 may encode a trust anchor encrypted using a cryptographic key. In this example scenario, the trust anchor and the cryptographic key may be known by the label vendor and the product manufacturer.

After the first printing phase 302 is performed, the partially completed attestation labels may be sent from the label vendor to the product manufacturer, factory, distribution center, retail store, or another suitable supply chain location where the second printing phase 304 may be performed. The second printing phase 304 may be performed using a non-secure printer that does not have an ability to employ the above described security features, and merely prints on the attestation label using typical ink. While such a printer may be used to reduce cost, more secure printers optionally may be used.

In some implementations, in order to increase security throughout the supply chain, an authenticity of the partially printed attestation labels may be verified by the product manufacturer. In particular, the first readable object may be decoded and decrypted using the cryptographic key that is known by the product manufacturer. Since the product manufacturer knows the trust anchor, the product manufacturer may compare the decrypted value with the trust anchor to verify that the attestation label is authentic. Further, the product manufacturer may determine whether the trust anchor is valid such that the attestation label may be still usable. In other words, the product manufacturer may determine that the trust anchor included in the attestation label has not been compromised.

The second printing phase 304 may include associating an attestation label with a product (e.g., device 200). For example, the attestation label may be affixed to a product in a factory line using a tamper-resistant or tamper-evident method. The non-secure printer may print the visually-readable identification code 106 of the associated product on the attestation label 100. Further, the visually-readable identification code 106 may be encrypted using the trust anchor. The resulting encrypted value as well as attestation service computing device information may be encoded as the second readable object 104. The non-secure printer may print the second readable object 104 on the attestation label 100.

In different implementations, the non-secure printer may be positioned at various points in the supply chain of the product. For example, the non-secure printer may perform the second printing phase at a product manufacturer or factory. As another example, the non-secure printer may perform the second printing phase at a distribution center. As another example, the non-secure printer may perform the second printing phase at a retail store (e.g., at a point of sale). The non-secure printer may perform the second print phase at any suitable point in the supply chain of the product.

In some implementations, the non-secure printer may print the second readable object 104 in a color different from the first readable object 102. By printing in different colors, the visual complexity of the attestation label may be increased to reduce the likelihood of counterfeiting the attestation label.

The attestation label 100 may be printed using the two-phase printing process 300 in order to maintain supply chain flexibility. In particular, by printing the attestation labels in two phases, different attestation labels may be dynamically associated with different products in order to accommodate varying levels of inventory held and distributed by the product manufacturer. Moreover, a secure printer may be significantly more costly than a non-secure printer. As such, a non-secure printer may be employed at different supply chain locations to perform the second printing phase instead of a secure printer in order to reduce costs.

The above described two-phase printing process is merely one example of a printing process that may be employed to print an attestation label. Moreover, an attestation label may be printed in any suitable manner and/or according to any suitable process. For example, in some implementations, an attestation label may be printed according to a single phase process performed by a single printer (e.g., either a secure printer or a non-secure printer).

Figure 4:
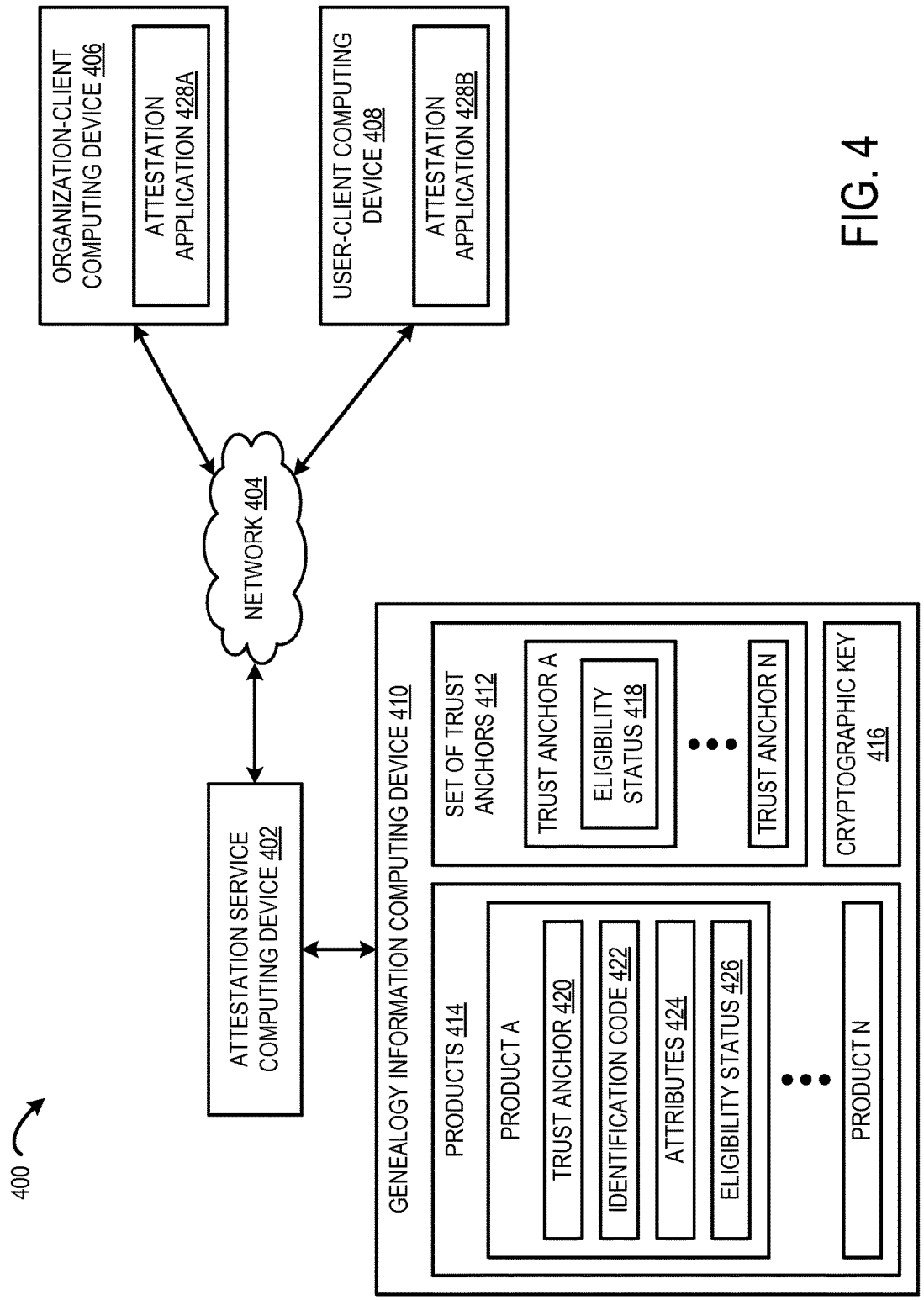
FIG. 4 shows an example authentication and validation computing environment.

FIG. 4 shows an example authentication and validation computing environment 400. The computing environment 400 may include an attestation service computing device 402. The attestation service computing device 402 may be configured to provide various authentication and validation functionality for different attestation labels and/or associated products. The attestation service computing device 402 may be in communication with various client computing devices via a network 404, such as the Internet. For example, the attestation service computing device 402 may be in communication with an organization-client computing device 406 and a user-client computing device 408. The attestation service computing device 402 may be in communication with any suitable number and/or type of client computing devices at any given time to provide authentication and/or validation functionality related to attestation labels. As non-limiting examples, the client computing devices may represent a computing device, such as a laptop computer, tablet computer, wearable computing device, smartphone, or other computing device capable of scanning an attestation label and decoding readable objects (e.g., QR codes) on the attestation label.

The organization-client computing device 406 may represent any suitable computing device that is associated with a label vendor or serves a role within a product supply chain and or lifecycle of a product. For example, the organization-client computing device 406 may represent a computing device employed at a label vendor that creates an attestation label. In another example, the organization-client computing device 406 may represent a computing device employed at a product manufacturer that produces a product associated with the attestation label. In yet another example, the organization-client computing device 406 may represent a computing device employed at a product distribution center in which the product is stored and/or distributed. In yet another example, the organization-client computing device 406 may represent a computing device employed at a retail store that sells the product and handles a return of the product. Such computing devices may be considered "internal" computing devices that have knowledge of confidential information (e.g., a trust anchor or a cryptographic key) related to the attestation label and/or the associated product.

The user-client computing device 408 may represent any suitable computing device that may be used by a consumer to determine a validity of a product associated with an attestation label. In one example, the user-client computing device 408 is used by a consumer to authenticate a product before purchasing the product. Such computing devices may be considered "external" computing devices that do not have knowledge of confidential information related to the attestation label and/or the associated product.

The attestation service computing device 402 may be configured to communicate with a genealogy information computing device 410. The genealogy information computing device 410 may be configured to store and organize attestation label, product, and trust anchor information that may be used by the attestation service computing device 402 to provide authentication and validation functionality. For example, such information may be organized in a database. In particular, the genealogy information computing device 410 may include a set of available trust anchors 412 (e.g., TRUST ANCHOR A—TRUST ANCHOR N) a listing of products 414 (e.g., PRODUCT A—PRODUCT N), and one or more cryptographic keys 416.

Each of the trust anchors in the set of available trust anchors 412 may be encrypted and encoded into different attestation labels to provide a mechanism for authenticating the attestation labels. Each trust anchor may include a trust anchor eligibility status 418. The trust anchor eligibility status 418 may indicate whether a trust anchor is valid or compromised. For example, a trust anchor may be determined to be compromised if the trust anchor is determined to have been used in a counterfeit attestation label.

Each of the products of the listing of products 414 may include a trust anchor 420, a visually-readable identification code 422, a plurality of product-specific attributes 424, and a product eligibility status 426. The trust anchor 420 may be encoded in a readable object of the attestation label affixed to the product. The visually-readable identification code 422 (e.g., a SKU or a serial number) may be printed on the attestation label affixed to the product. The plurality of product-specific attributes 424 may be linked or associated to the visually-readable identification code 422. The plurality of product-specific attributes 424 may include any suitable information that characterizes the particular instance of the product. In one particular example the product is a device, and the plurality of product-specific attributes 424 include a list of components included in the device. Each component includes an individualized component identification code that links the particular component to the particular device. The product eligibility status 426 may indicate whether a product is valid or compromised/banned. For example, a product may be determined to be compromised/banned if it is determined that the product has been previously tampered with or otherwise modified in an unauthorized manner.

In some implementations, the genealogy information computing device 410 and the attestation service computing device 402 may be integrated into a single computing device. In other implementations, the service and/or the database may be dispersed over a plurality of different computing devices, such as part of a cloud-computing implementation.

As mentioned above, the attestation service computing device 402 may be configured to provide authentication and validation functionality. In one example, the attestation service computing device 402 may be configured to receive from a client computing device information read from an attestation label. In one example, the client computing device is the organization-client computing device 406. In another example, the client computing device is the user-client computing device 408. For example, the received information may be associated with a particular attestation label and may include a first encrypted value decoded from a first readable object, a second encrypted value decoded from a second readable object, and a visually-readable identification code.

The attestation service computing device 402 may be configured to look up the trust anchor associated with the visually-readable identification code in the genealogy information computing device 410. The attestation service computing device 402 may be configured to decrypt the second encrypted value using the trust anchor to produce a second decrypted value. If the second decrypted value does not match the visually-readable identification code, then the attestation service computing device 402 may be configured to determine that the attestation label is counterfeit, and in response to determining that the attestation label is counterfeit, send to the client computing device an indication that the attestation label is counterfeit.

If the second decrypted value matches the visually-readable identification code, then the attestation service computing device 402 may be configured to decrypt the first encrypted value using the cryptographic key 416 to produce a first decrypted value. If the first decrypted value matches the trust anchor that was looked up from the genealogy database, then the attestation service computing device 402 may be configured to determine that the attestation label is authentic, and in response to determining that the attestation label is authentic, send to the client computing device an indication that the attestation label is authentic.

Furthermore, in some implementations, the attestation service computing device 402 may be configured to look up the eligibility status associated with the trust anchor and/or the product in the genealogy information computing device 410. If the eligibility status indicates that the product is valid, then the attestation service computing device 402 may be configured to send to the client computing device an indication that the product is valid or is in good standing in response to determining that the product is valid. If the eligibility status indicates that the product is compromised, then the attestation service computing device 402 may be configured to send to the client computing device an indication that the product is compromised in response to determining that the product is compromised.

Note that in some cases, even if the attestation label is authentic, the product may still be compromised due to being tampered with. Detection of tampering with a label may be detected inline via verification with the attestation service computing device, or offline by processes that analyze data collected by the attestation service computing device. For example, frequent authentication attempts for the same product may indicate that the product has been compromised and/or may cause the product to be flagged as a fraud risk. In another example, if the attestation service computing device receives authentication attempts for the same product from two different geographical locations (e.g., China and the US) within in a short period of time, then the product maybe flagged as counterfeit or compromised in future authentication attempts. Any suitable type of anomaly detection methods may be employed to identify a counterfeit product offline based on data collected by the attestation service computing device.

Furthermore, in some implementations, the attestation service computing device 402 may be configured to look up the attributes associated with a product based on the visually-readable identification code in the genealogy information computing device 410. The attestation service computing device 402 may send to the client computing device the attributes of the product. In one example, the attributes may be sent to a user-client computing device to ensure that the attributes match the product prior to a user purchasing the product. In another example, the attributes may be sent to the organization client computing device to ensure that the attributes match a product prior to allowing the product to be returned to a retail store.

The organization-client computing device 406 and the user-client computing device 408 may interface with the attestation service computing device 402 via an attestation application. In some implementations, the attestation application may be configured differently to meet the needs and levels of confidentiality of the different clients (e.g., organization vs. user). For example, the attestation application 428A, executed by the organization-client computing device 406 may be a signed application that may be trusted by the attestation service computing device 402. As such, the attestation service computing device 402 may provide more/different information associated with a product or an attestation label. On the other hand, the attestation application 428B, executed by the user-client computing device 408 may be an unsigned application that may not be trusted by the attestation service computing device 402. As such, the attestation service computing device 402 may provide less/different information associated with a product or an attestation label.

In one example implementation, an organization may provide an encryption key (e.g., a shared secret) to a secure printer. The secure printer may generate a random value. The secure printer may encrypt the random value with the encryption key received from the organization. The secure printer may encode the encrypted value as a first QR code and may print the first QR code on an attestation label. The secure printer may send the attestation label to a non-secure printer (e.g., at a factory or other location in the supply chain).

The non-secure printer may decode the first QR code and decrypt the encrypted value using the encryption key received from the organization or the secure printer. The non-secure printer may retrieve the embedded random value that was assigned/embedded by the secure printer in the first QR code. The non-secure printer may encrypt a product identification code (e.g., a serial number) of a product associated with the attestation label with the random value. The non-secure printer may encode the encrypted value as a second QR code and may print the second QR code on the attestation label. The non-secure printer may print a non-encoded representation of the product identification code on the attestation label.

Figure 5:
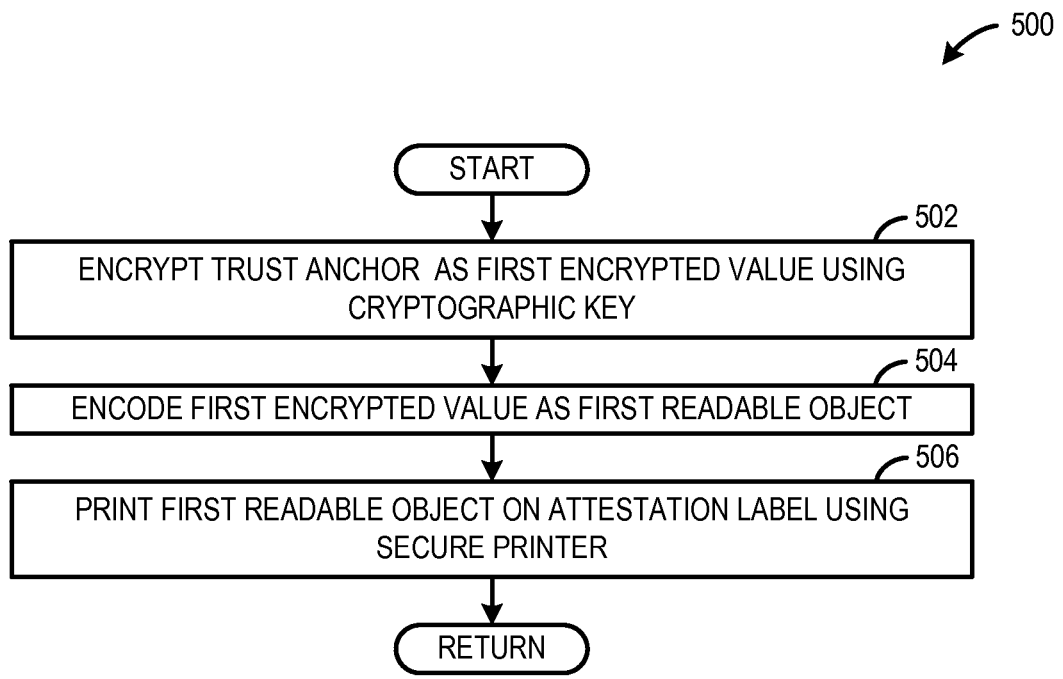
FIG. 5 shows an example method for printing information on an attestation label via a secure printer.

Further, a client may scan the attestation label to verify authenticity of the product. The client may forward the information printed on the attestation label to an attestation service. For example, the client may capture an image of the label and send the image to the attestation service. The attestation service may read the label and may decode the first QR code to produce the encrypted value. The attestation service may decrypt the encrypted value using the encryption key received from the organization, the secure printer, or the non-secure printer/factory. The attestation service may retrieve the random value assigned by the secure printer. The attestation service may decode the second QR code to produce the encrypted value. The attestation service may decrypt the encrypted value using the random value that was retrieved from the first QR code. The attestation service may retrieve the identification code assigned by the non-secure printer. The attestation service may verify that the product identification code embedded in the second QR code matches the non-encoded representation of the product identification code printed on the attestation label to verify the authenticity of the product FIG. 5 shows an example method 500 for printing information on an attestation label via a secure printer. For example, the method 500 may be performed by a computing device included in or controlling a secure printer, such as computing system 1000 shown in FIG. 10.

At 502, the method 500 may include encrypting a trust anchor as a first encrypted value using a cryptographic key. The trust anchor may include any suitable secret information including numbers, letters, characters, or a combination thereof. At 504, the method 500 may include encoding the first encrypted value as a first readable object. For example, the first readable object may be a visually-readable object. In one particular example, the first readable object is a QR code. At 506, the method 500 may include printing the first readable objet on an attestation label using a secure printer. The secure printing process may include any suitable security feature as discussed above. One or more other features, such as a brand logo may optionally may be printed by the secure printer.

Figure 6:
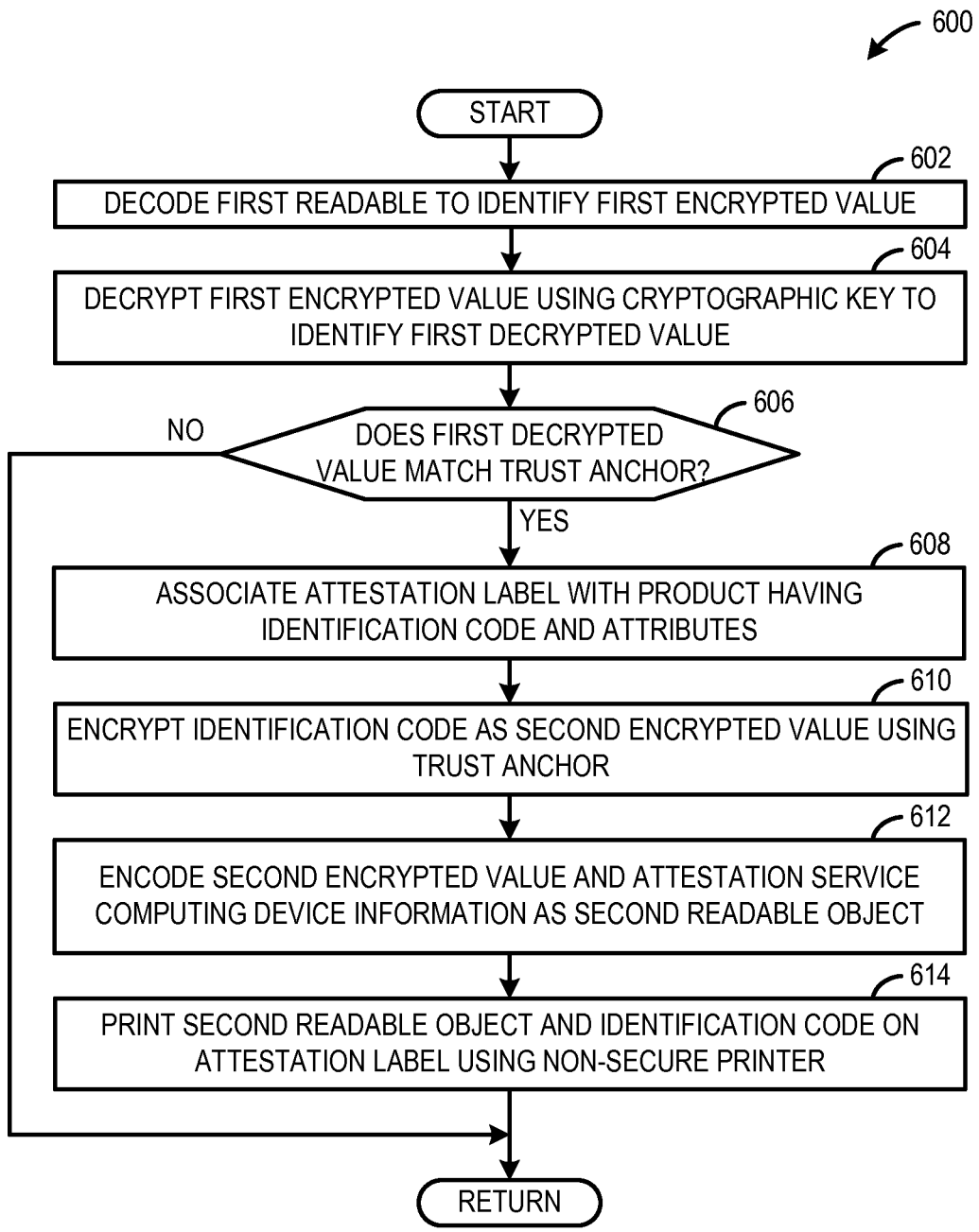
FIG. 6 shows an example method for printing information on an attestation label via a non-secure printer.

FIG. 6 shows an example method 600 for printing information on an attestation label via a non-secure printer. For example, the method 600 may be performed by a computing device included in or controlling a non-secure printer, such as computing system 1000 shown in FIG. 10.

The method 600 optionally may include verifying the authenticity of the partially printed attestation label prior to completing the printing process. Such additional measures may reduce the likelihood of the attestation label of being counterfeited. In particular, at 602, the method 600 optionally may include decoding the first readable object to identify the first encrypted value. At 604, the method 600 optionally may include decrypting the first encrypted value using the cryptographic key to identify the first decrypted value. At 606, the method 600 optionally may include determining whether the first decrypted value matches the trust anchor. If the first decrypted value matches the trust anchor, then the method 600 moves to 608. Otherwise, the method returns to other operations. In some implementations, the failed verification may be flagged for investigation to determine if the system has been compromised.

At 608, the method 600 may include associating the attestation label with a product having a visually-readable identification code and associated attributes. At 610, the method 600 may include encrypting the visually-readable identification code as a second encrypted value using the trust anchor. At 612, the method 600 may include encoding the second encrypted value and attestation service information as the second readable object. For example, the attestation service information may include an address, such as a URL of the attestation service computing device. At 614, the method 600 may include printing the second readable object and the non-encoded and human-readable identification code on the attestation label using a non-secure printer.

Figure 7:
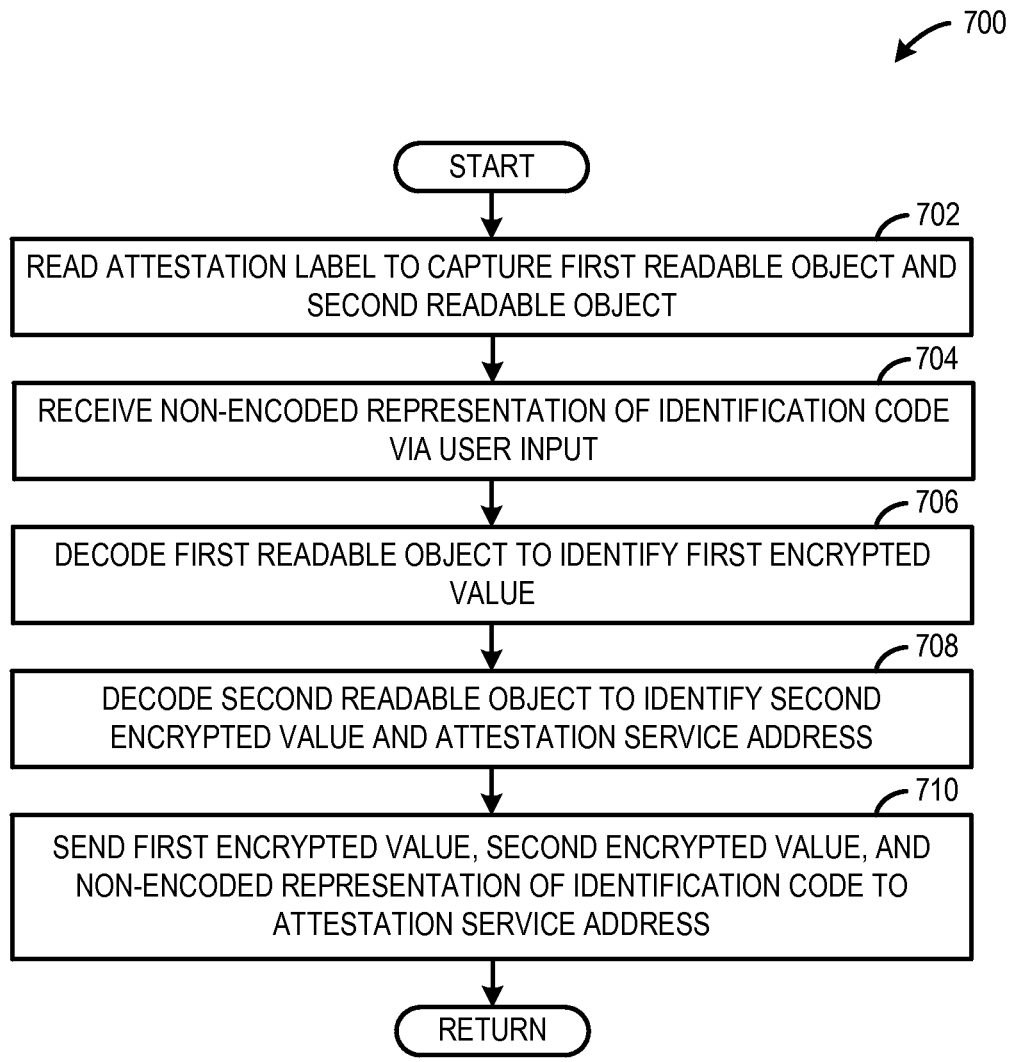
FIG. 7 shows an example method for forwarding information encoded on an attestation label to verify authenticity of the attestation label.

FIG. 7 shows an example method 700 for forwarding information encoded on an attestation label to verify authenticity of the attestation label. For example, the method 700 may be performed by a client computing device. In one example, the client computing device includes the organization-client computing device 406 shown in FIG. 4. In another example, the client computing device includes the user-client computing device 408 shown in FIG. 4.

At 702, the method 700 may include reading the attestation label to capture the first readable object and the second readable object.

At 704, the method 700 may include receiving a non-encoded representation of an identification code printed on the attestation label via user input to the client computing device.

In other implementations, the non-encoded representation of the identification code need not be provided to the attestation service, and the attestation service may instead provide a human-readable identification code corresponding to the product. The user may compare the human-readable identification code printed on the attestation label with the human-readable identification code received from the attestation service to verify that the identification codes match.

At 706, the method 700 may include decoding the first readable object to identify the first encrypted value. At 708, the method 700 may include decoding the second readable object to identify the second encrypted value. At 710, the method 700 may include sending the first encrypted value, the second encrypted value, and the non-encoded representation of the identification code to the address of the attestation service computing device.

Figure 8:
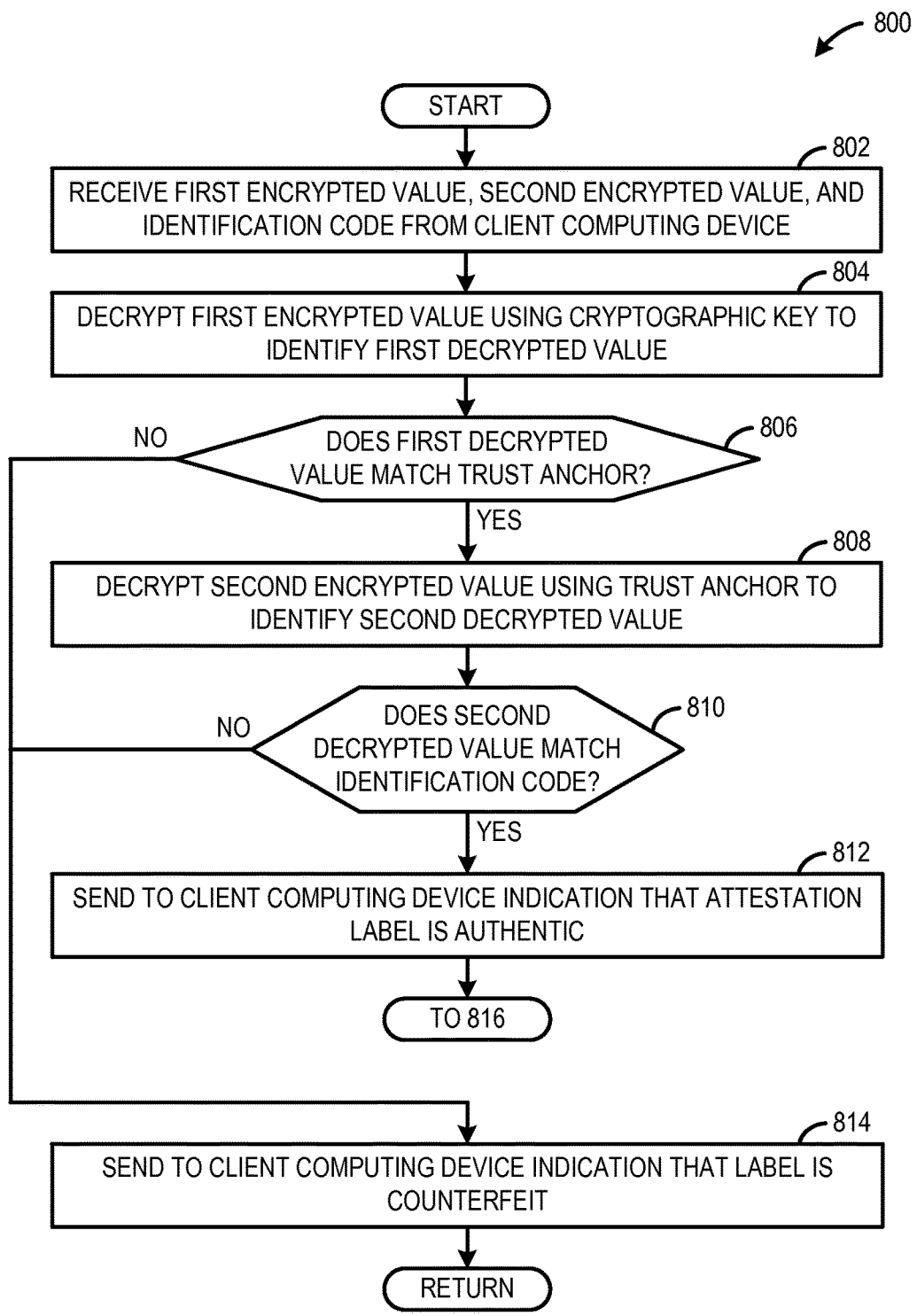
FIGS. 8 and 9 show an example method for verifying authenticity of an attestation label.
Figure 9:
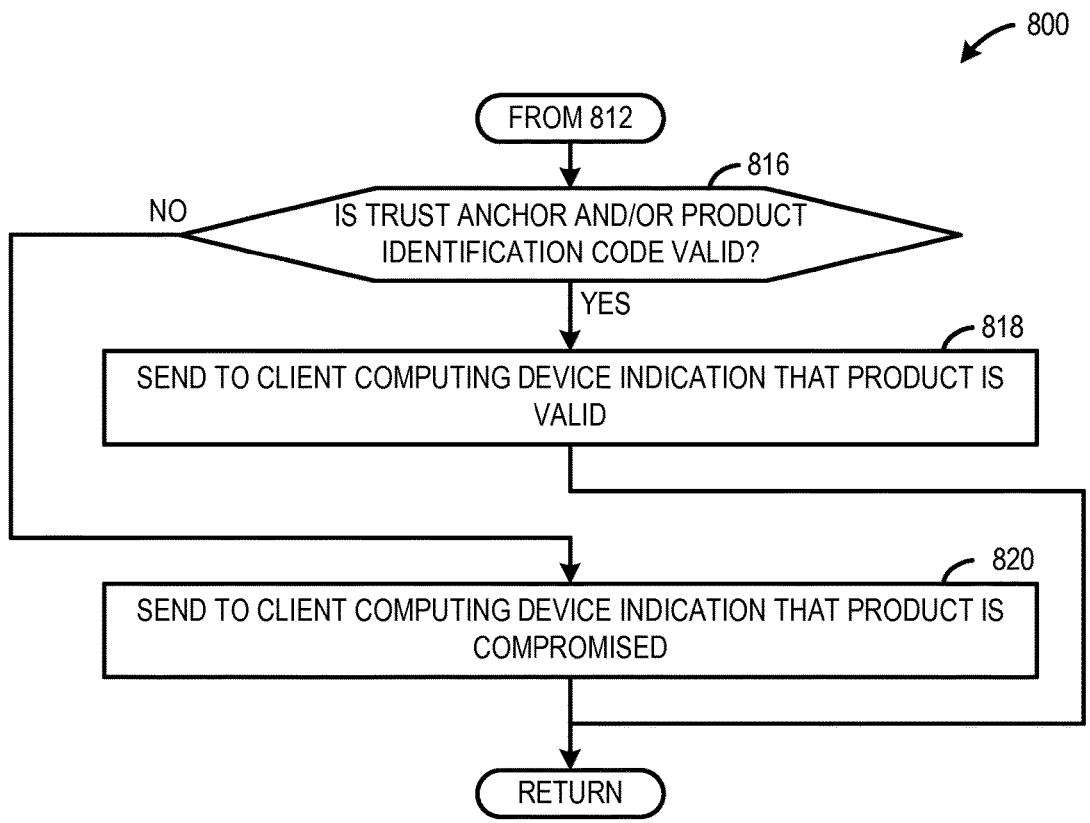

FIGS. 8 and 9 show an example method 800 for verifying authenticity of an attestation label. For example, the method 800 may be performed by the attestation service computing device 402 shown in FIG. 4.

At 802, the method 800 may include receiving a first encrypted value, a second encrypted value, and a visually-readable, non-encoded representation of the identification code from a client computing device. The first encrypted value may be decoded from a first readable object and the second encrypted value may be decoded from a second readable object. The first readable object, the second readable object, and the visually-readable identification code may be included on an attestation label associated with a product.

At 804, the method 800 may include decrypting the first encrypted value using a cryptographic key to identify a first decrypted value. At 806, the method 800 may include determining whether the first decrypted value matches a trust anchor. If the first decrypted value matches the trust anchor, then the method 800 moves to 808. Otherwise, the method 800 moves to 814.

At 808, the method 800 may include decrypting the second encrypted value using the trust anchor to identify a second decrypted value. At 810, the method 800 may include determining whether the second decrypted value matches the visually-readable identification code. If the second decrypted value matches the visually-readable identification code, then the method 800 moves to 812. Otherwise, the method 800 moves to 814.

At 812, the method 800 may include sending to the client computing device an indication that the attestation label is authentic. At 814, the method may include sending to the client computing device an indication that the attestation label is counterfeit, and returning to other operations.

At 816, the method 800 may include determining whether the trust anchor and/or the product identification code is valid. For example, the validity of the trust anchor and/or the product identification code may be determined by looking up an eligibility status of the trust anchor in a genealogy information computing device. If the trust anchor is determined to be valid, then the method 800 moves to 818. Otherwise, the method 800 moves to 820.

At 818, the method 800 may include sending to the client computing device an indication that the product is valid, and returning to other operations. At 820, the method 800 may include sending to the client computing device an indication that the product is compromised, and returning to other operations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
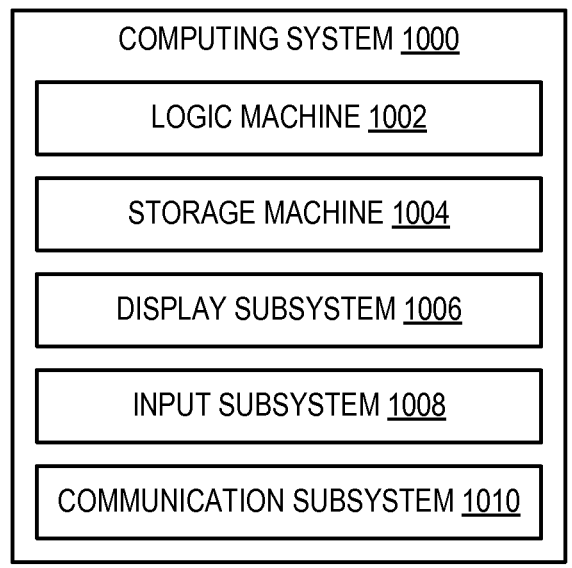
FIG. 10 shows an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), secure printer computing devices, non-secure printer computing devices, and/or other computing devices. For example, computing system 1000 may represent the attestation service computing device 402, the organization-client computing device 406, and the user-client computing device 508 shown in FIG. 4.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An attestation label, comprising:
    a first readable object encoding a trust anchor encrypted with a cryptographic key, the first readable object printed on the attestation label by a secure printer;
    a second readable object encoding attestation service information and an identification code encrypted using the trust anchor, the second readable object printed on the attestation label by a non-secure printer; and
    a non-encoded representation of the identification code.

2. The attestation label of claim 1, wherein the first readable object is a visually-readable object and the second readable object is a visually-readable object.

3. The attestation label of claim 1, wherein the identification code is encrypted using the trust anchor in combination with the identification code.

4. The attestation label of claim 1, wherein the identification code is encrypted using the trust anchor in combination with a cryptographic salt.

5. The attestation label of claim 1, wherein the attestation service information includes an address of an attestation service computing device, and wherein the attestation service computing device is configured to verify whether the attestation label is authentic.

6. The attestation label of claim 5, wherein the trust anchor is selected from a set of available trust anchors, and wherein if any trust anchor of the set of available trust anchors becomes compromised, the attestation service is configured to indicate that attestation labels including the trust anchor are compromised.

7. The attestation label of claim 1, wherein the first readable object is a first matrix barcode having a first color, and wherein the second readable object is a second matrix barcode having a second color different from the first color.

8. A device, comprising:
- a housing including:
  - a first portion, and
  - a second portion coupled to the first portion to form a seam; and
- an attestation label affixed across the seam, the attestation label including:
  - a first visually-readable object encoding a trust anchor encrypted with a cryptographic key, the first readable object printed on the attestation label by a secure printer;
  - a second readable object encoding attestation service information and an identification code encrypted using the trust anchor, the second readable object printed on the attestation label by a non-secure printer; and
  - a non-encoded representation of the identification code.

9. The device of claim 8, wherein the identification code is encrypted using the trust anchor in combination with the identification code.

10. The device of claim 8, wherein the attestation service information includes an address of an attestation service computing device, and wherein the attestation service computing device is configured to verify whether the visually-readable identification code is authentic.

11. The device of claim 8, wherein the attestation service computing device is configured to determine an eligibility status of the device.

12. The device of claim 11, wherein the trust anchor is selected from a set of available trust anchors, and wherein if any trust anchor of the set of available trust anchors becomes compromised, the attestation service computing device is configured to indicate that devices having attestation labels including the trust anchor are compromised.

13. The device of claim 8, wherein the attestation service computing device is configured to provide a plurality of attributes of the device based on the visually-readable identification code.

14. The device of claim 8, wherein the first visually-readable object is a first matrix barcode having a first color and the second visually-readable object is a second matrix barcode having a second color different from the first color.

* * * * *